United States Patent
Scharnke et al.

(10) Patent No.: US 7,696,265 B2
(45) Date of Patent: Apr. 13, 2010

(54) IR REFLECTIVE ELEMENTS MADE OF IMPACT-RESISTANCE PLASTIC, AND A PROCESS FOR THEIR PRODUCTION

(75) Inventors: Wolfgang Scharnke, Darmstadt (DE); Volker Mende, Darmstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 797 days.

(21) Appl. No.: 11/441,111

(22) Filed: May 26, 2006

(65) Prior Publication Data

US 2006/0217461 A1    Sep. 28, 2006

Related U.S. Application Data

(63) Continuation of application No. 10/139,385, filed on May 7, 2002, now Pat. No. 7,129,285.

(30) Foreign Application Priority Data

May 8, 2001   (DE)   ................................ 101 22 315

(51) Int. Cl.
*C08K 9/00*   (2006.01)
(52) U.S. Cl. ..................... 523/200; 523/210; 524/430
(58) Field of Classification Search ............... 523/200, 523/210; 524/430
See application file for complete search history.

(56) References Cited

U.S. PATENT DOCUMENTS

| | | | |
|---|---|---|---|
| 4,057,607 A | 11/1977 | Soehngen et al. |
| 5,115,016 A | 5/1992 | Dickens et al. |
| 6,291,551 B1 | 9/2001 | Kniess et al. |
| 6,424,406 B1 | 7/2002 | Mueller et al. |
| 7,129,285 B2 | 10/2006 | Scharnke et al. |

FOREIGN PATENT DOCUMENTS

| | | |
|---|---|---|
| DE | 25 44 245 | 4/1977 |
| DE | 27 19 170 | 11/1978 |
| EP | 0 548 822 | 6/1993 |
| EP | 0 733 754 | 9/1996 |

OTHER PUBLICATIONS

Merckchemicals.com, (2009).*
U.S. Appl. No. 11/813,975, filed Jul. 13, 2007, Mende, et al.
U.S. Appl. No. 11/813,594, filed Jul. 10, 2007, Scharnke, et al.

* cited by examiner

*Primary Examiner*—Edward J Cain
(74) *Attorney, Agent, or Firm*—Oblon, Spivak, McClelland, Maier & Neustadt, L.L.P.

(57) ABSTRACT

A process for the production of a translucent, IR-reflective plastic element, consisting entirely or at least in part of an impact-resistant, thermoplastic plastic, containing IR-reflective particles made of a lamellar-shaped carrier pigments coated with a metal oxide and the plastic element made therefrom.

22 Claims, No Drawings

IR REFLECTIVE ELEMENTS MADE OF IMPACT-RESISTANCE PLASTIC, AND A PROCESS FOR THEIR PRODUCTION

This is a continuation application of U.S. application Ser. No. 10/139,385, filed May 7, 2002.

BACKGROUND OF INVENTION

1. Field of the Invention

The present invention relates to IR-reflective elements made of impact-resistant plastic, and a process for their production.

2. Discussion of the Background

The use of disks of polymethyl methacrylate containing light-reflective particles aligned parallel to a surface is described in DE 25 44 245. The pigment particles used cause a selective reflection in the infrared range, which can be characterized by a selectivity number of greater than 1. $TiO_2$, lead carbonate, and bismuth oxychloride are mentioned as IR-reflective pigments. The use of anatase-type $TiO_2$ pigments, precipitated onto mica laminae, is described. Further, a layer of anatase-type $TiO_2$ pigment having a thickness of approximately 120 μm is emphasized as being particularly advantageous.

The particles as described in DE 25 44 245 are dispersed in a partially polymerized methyl methacrylate to form a suspension at a concentration ranging from 0.01 to 1 wt. %. Thereafter, the suspension is fully polymerized, producing polymethyl methacrylate, in a chamber between glass plates. If the chamber is positioned horizontally, the pigment-mica particles of the suspension align parallel to the disk surface as they drop. This phenomenon yields fully polymerized disks having the desired IR-reflective effect. This parallel alignment of the IR-reflective particles can be improved if the glass plates of the chamber are moved several times in a circular motion relative to one another while the polymerizing material is still in a gel state.

DE 25 44 245 describes the possibility of working IR-reflective pigments into molding masses. The pigments then align parallel to the surface when the masses are processed using calendering, extrusion, or injection-molding.

EP-A 0 548 822 describes translucent, IR-reflective elements having a sun-protection and heat-insulation effect. These elements include sheets, web plates, and domelights. The elements have a transmission, T, in the visible spectrum ranging from 45 to 75%. The transmission is defined as the degree of light transmission for daylight, i.e. standard light type D65 or $T_{D65}$. They also have a total energy transmission degree, g, ranging from 30 to 60%. Further, they have a ratio of T/g, i.e. $T_{D65}$/g, at least 1.15. These measurements result from those experiments described according to DIN 67 507.

The translucent, IR-reflective elements of EP-A 0 548 822 can be produced from a rigid, amorphous base material made of translucent plastic and a translucent coating material containing from 20 to 40 wt. % of IR-reflective particles. The IR-reflective particles consist of a layer of titanium dioxide. The titanium layer is present at a thickness ranging from 60 to 120 nm on a lamellar-shaped carrier pigment, and is formed by co-extrusion or coating processes. Coating processes include lacquering or reverse-roll-coating. A coating layer that is 5 to 40 micrometers thick and contains the IR-reflective particles adheres to the base material made of a transparent binder not soluble in water. The IR-reflective particles are aligned parallel to the surface of the base material.

In the examples of EP-A 0 548 822, rutile type $TiO_2$ pigments are used. EP-A 0 548 822 recommends the selection of a binder for the IR-reflective layer that has a lower melt viscosity than that of the base material for co-extrusion. In order to prevent the pigments from breaking, a twin-screw extruder having closely interlocking screws that rotate in opposite directions is used, and the pigment is worked directly into the melt.

Multi-web plates made of polymethyl methacrylate having a co-extruded IR-reflective finish are commercially available according to EP-A 0 548 822. Further, multi-web plates made of polycarbonate having a corresponding IR-reflective finish are known to improve weather-resistance. Here, another co-extruded layer containing UV-absorbers is located on the co-extruded pigment layer.

DE 196 569 A1 describes multi-layer interference pigments consisting of transparent carrier materials that are coated with alternating layers of metal oxides having a low and a high index of refraction, where the difference between the indices of refraction is at least 0.1. Accordingly, an alternating layer of $TiO_2/SiO_2/TiO_2$ can be placed on mica laminae. The pigments described in DE 196 18 569 A1 are suitable for pigmentation of agricultural films in order to keep out infrared radiation from the sun, thereby preventing excessive heating of greenhouses.

EP-A 0 733 754 describes multi-web plates made of a polymethyl methacrylate modified to be impact-resistant. Depending on the impact resistance of the material used and the minimum thickness of the top flange of the multi-web plates, multi-web plates having high fracture resistance under stress due to hailstones is achieved. Accordingly, typical stress resistance of the multi-web plates in a hail shooting test using polyamide balls of at least 2 J, preferably at least 5 J, is desired and achieved. Furthermore, EP-A 0 733 754 additionally equips the multi-web plates with functional layers. These functional layers include scratch-resistance, anti-reflective, water-spreading or IR-reflective coatings on the outside or the inside of the multi-web plates.

JP-OS 08-53555 describes IR-reflective sheets of acrylic plastic containing an impact resistant modifier. The sheets are based on cross-linked emulsion polymers containing butyl acrylate and IR-reflective pigments in amounts ranging from 0.5 to 30 wt. %. The thickness of the sheets with co-extruded layers or for solid sheets may range 10 μm to 5 mm. Working the pigments into an acrylic plastic modified to be impact-resistant takes is achieved by utilizing two steps. First, the pigment is mixed with the granulate in the dry state. Then, the mixture is extruded to form a granulate.

JP-OS 08-52335 describes IR-reflective sheets or containing polycarbonate, and having a thickness of at least 0.5 mm. The sheets are also contain a co-extruded layer of an acrylic plastic modified to be impact-resistant. Further, the sheets contain IR-reflective pigments in amounts ranging from 0.5 to 20 wt. %. The co-extruded layers have thicknesses ranging from 20 to 300 μm. Working the pigments into the acrylic plastic modified to be impact-resistant is achieved by utilizing two steps. First, the pigment is mixed with the granulate while dry in a tumbler mixer. Then the mixture is extruded to form a granulate.

Multi-web plates with a high resistance to weathering and a very good resistance to hail impact are described in EP-A 0 733 754. For an additional IR-reflective finish on the multi-web plates, EP-A 0 733 754 recommends the application of a functional IR-reflective layer as described in EP-A 0 548 822. However, it has been shown that the additional pigment layer which imparts excellent IR-reflection and is co-extruded, is not as hail-resistant as a plate without the additional pigment layer. The IR-reflective layer, which can contain 25 wt. % IR-reflective pigment, is more brittle under stress due to hail compared to that of the underlying impact-resistant polymethyl methacrylate. This can result in the formation of tiny cracks in the IR-reflective layer in the presence of hail. These cracks are barely visible at first, but can propagate as the plate is subjected to the effects of weather. Therefore, the IR-reflective layer can start to flake off after some time.

DE 25 44 245 describes the possibility of working the IR-reflective pigments into molding masses. Here, the pigments align themselves parallel to a surface during the course of processing. However, it has been shown that it is not possible to achieve an effect that corresponds to EP-A 0 548 822. The alignment of the particles in a plastic element made of an extruded molding mass that contains uniformly distributed IR-reflective pigment is not as good as for a co-extruded or lacquered separate layer. Also, the relatively high tendency of these particles to fracture appears to be another problem. The lower rate of surface-parallel alignment, combined with a comparatively high proportion of breakage, generally leads to unsatisfactory results.

This is particularly true for plastic elements with a comparatively complex geometry deviating from a simple plate shape. During the production of such plastic elements, different melt flow directions and shear forces occur during extrusion which force the pigment particles into different alignments. Accordingly they are exposed to greater overall mechanical stress. These shapes include hollow elements such as double-web plates and, in particular, complicated hollow elements such as multi-web plates, latticework plates, etc.

JP-OS 08-53555 and JP-OS 08-52335 describe the extrusion and co-extrusion of acrylic plastic modified to be impact-resistant and containing IR-reflective pigments. Since the two components are mixed under dry conditions, a high proportion of the pigment breaks. Since the pigment fragments reduce transmission and reflect IR waves poorly or not at all, the efficiency of the IR-reflection cannot be optimized with respect to the amount of pigment used

SUMMARY OF THE INVENTION

One object of the present invention is a process for the manufacture of a plastic element.

Another object of the present invention is a process for the manufacture of a plastic elements having resistance to hail.

Another object of the invention is a process for the manufacture of a plastic element having degree of light transmission for daylight, T and a low total energy passing through the plastic element.

Another object of the invention is a process for the manufacture of a plastic element comprising 0.01 to 2 wt.-% of IR-reflective particles made of a lamellar-shaped carrier pigments coated with a metal oxide.

Another object of the invention is a process for the manufacture of a plastic element comprising 5 to 40 wt. % of the IR-reflective particles and a low-viscosity thermoplastic plastic.

Another object of the invention is a process for the manufacture of a plastic element comprising 5 to 40 wt. % of the IR-reflective particles, a low-viscosity thermoplastic, and a white pigment.

Another object of the invention is a process for the manufacture of a plastic element having a multi-web plate.

Another object of the invention is a process for the manufacture of a plastic element comprising a co-extruded flange of a multi-web plate.

Another object of the invention is a process for the manufacturing a roof or facade comprising a plastic element comprising 5 to 40 wt. % of the IR-reflective particles and a low-viscosity thermoplastic plastic.

Another object of the invention is a roof or facade comprising a plastic element comprising 5 to 40 wt. % of the IR-reflective particles and a low-viscosity thermoplastic plastic.

The objects of the present invention, and others, may be accomplished with a process for the manufacture of a plastic element comprising processing a plastic mixture by means of extrusion or co-extrusion wherein producing a pre-mixture of from 5 to 40 wt. % of the IR-reflective particles with a low-viscosity thermoplastic plastic wherein the IR-reflective particles are mixed with the melt of the low-viscosity thermoplastic plastic at a temperature of at least 280° C. in a pressure-free, non-shearing zone of a twin-screw extruder;

extruding said pre-mixture;

converting said pre-mixture to granulate form;

subsequently mixing in an extruder the granulate directly or as a melt with a granulate or a melt of a polymethyl methacrylate modified to be impact-resistant to form a plastic mixture wherein said polymethyl methacrylate comprises a polymer matrix and an agent to modify impact resistance;

extruding or co-extruding the resultant plastic mixture with a melt of a thermoplastic plastic into an extrudate having a desired shape; and cooling said extrudate having a desired shape.

DETAILED DESCRIPTION OF THE PRESENT INVENTION

As discussed above, a need exists for a process of manufacturing IR-reflective plastic elements with a high resistance to weathering. In particular, a process of manufacturing IR-reflective plastic elements that are hail-resistant is required.

The present invention fulfills this need by providing a process for the manufacturing of a translucent, IR-reflective plastic element. This element comprises an impact-resistant thermoplastic plastic. The thermoplastic plastic comprises from 0.01 to 2 wt. % of IR-reflective particles. The IR-reflective particles are made of a lamellar-shaped carrier pigment coated with a metal oxide.

The processing comprises production of the plastic mixture by extrusion or co-extrusion. First, a pre-mixture containing from 5 to 40 wt. % of the IR-reflective particles with a low-viscosity thermoplastic plastic is produced. The pre-mixture is generated by mixing the IR-reflective particles with the melt of the low-viscosity thermoplastic plastic at a temperature of at least 280° C. in a pressure-free, non-shearing zone of a twin-screw extruder. This mixture is then extruded and converted to granulate form. The resultant granulate is mixed in an extruder directly or as a melt with a granulate or a melt of a polymethyl methacrylate modified to be impact-resistant. The granulate or a melt of polymethyl methacrylate contains a polymer matrix and an agent to modify impact resistance. The resultant plastic mixture is then extruded or co-extruded with another melt of a thermoplastic plastic. The described extrusion or coextrusion can be modified to produce an extrudate having a desired shape. The desired plastic element is obtained from the extrudate after cooling.

The above-mentioned pigment in the granulate form does not break easily if the IR-reflective particles are mixed with the melt of the low-viscosity thermoplastic plastic at a temperature of at least 280° C., in a pressure-free, non-shearing zone of a twin-screw extruder. The plastic elements manufactured according to the above process have a resistance to hail that is elevated compared to plastic elements containing only impact-resistant polymethyl methacrylate and lacking the IR-reflective pigment. Further, the plastic elements manufactured according to the above process may contain a reduced amount of impact-resistance modifier contained in the molding mass. Since the agent to modify impact resistance is always more costly to produce than the polymethyl methacrylate matrix, the process according to the present invention results in cost savings.

As compared to the known multi-web plates of polymethyl methacrylate containing a coextruded IR-reflective finish, the process according to the present invention manufactures plastic elements with improved hail resistance, thereby improving long-term resistance to weather and/or hail. Further, the present invention does not require co-extrusion layers with a high proportion of pigment. Therefore, the production of plastic elements with a risk of increased brittleness under the effect of hail and crack formation resulting therefrom is avoided by the present invention.

The present invention also provides a process for the manufacturing of a translucent, IR-reflective plastic element. The plastic element according to the present invention comprises entirely an impact-resistant thermoplastic plastic. The impact-resistant thermoplastic plastic contains from 0.01 to 2 wt. %, preferably 0.1 to 1.5, especially preferably 0.5 to 1.3 wt. %, of IR-reflective particles. The ranges for the quantities of IR-reflective particles include all specific values and subranges therebetween, such as 0.02, 0.05, 0.1, 0.2, 0.4, 0.8, 1.0, 1.1, 1.2, 1.4, and 1.8 wt. %. The particles are made of a lamellar-shaped carrier pigment coated with a metal oxide.

The process according to the present invention takes place by means of extrusion of molding masses. First, a premixture comprising a low-viscosity thermoplastic plastic and from 5 to 40 wt. % of the IR-reflective particles is produced. The ranges for the quantities of IR-reflective particles include all specific values and subranges therebetween, such as 10, 15, 20, 25, 30, and 35 wt. %. The IR-reflective particles are mixed with the melt of the low viscosity thermoplastic plastic at a temperature of at least 280° C., preferably 290° C. to 320° C. The ranges for the quantities of the temperature include all specific values and subranges therebetween, such as 295, 300, 305, 310, and 315° C.

The IR-reflective particles and low viscosity thermoplastic plastic may be mixed in a pressure-free, non-shearing zone of a twin-screw extruder. Preferably, the twin-screw extruder has screws that rotate in opposite directions. Accordingly, the mixture of IR-reflective and low viscosity thermoplastic plastic is extruded and converted to granulate form. Subsequently, the granulate is mixed directly or as a melt in an extruder with a granulate of a polymethyl methacrylate modified to be impact-resistant. The granulate of a polymethyl methacrylate modified to be impact-resistant contains a polymer matrix and an agent to modify impact resistance. The plastic mixture is extruded or co-extruded together with another melt of a thermoplastic plastic, in a desired shape. The desired plastic element is obtained from the resulting extrudate after cooling.

In the inventive process, it is preferred to mix the granulate of the pre-mixture with the granulate of the one polymethyl methacrylate modified to be impact-resistant, and jointly melt this dry mixture when it is placed in the extruder because it is particularly gentle for the IR-reflective pigments obtained. The granulate of the pre-mixture can also be added to the melt of the polymethyl methacrylate modified to be impact-resistant. However, it is difficult to achieve a uniform distribution in the mass without breaking a high proportion of the pigments. It is also possible, but less preferred, to melt the granulates separately, e.g. in a main extruder and a secondary extruder, and subsequently combine the melt flows in one extruder, e.g. the main extruder. It appears to be less gentle for the pigments if the pre-mixture is melted in its concentrated form and used in this form initially.

The proportion of breaking within the IR-reflective pigment can be reduced if a granulate is produced from the pre-mixture. Here, the granulate may be obtained by breaking off the extrudate at a temperature, i.e. surface temperature of at least 50, preferably at 60 to 90° C. The ranges for the quantities of the temperature include all specific values and subranges therebetween, such as 65, 70, 75, 80, and 85° C. The granulate still possesses a certain softness in this temperature range, thereby keeping the breaking within the IR-reflective low during the step of breaking-off the granulate from the extrudate described above.

Low-viscosity thermoplastic plastics to be used according to the present invention may be those having a melt viscosity in the range of 100 to 3500, preferably 200 to 1000 Pas measured according to the process described in DIN 54 811, i.e. Process B 220° C./5 MPa (die L/D=4:1). The ranges for the quantities of the melt viscosity include all specific values and subranges therebetween, such as 200, 500, 750, 1000, 1500, 2000, and 3000 Pas.

The melt viscosity at the processing temperature is preferably 20 to 80%, more preferably 40 to 60%, lower in comparison with the melt viscosity of the polymethyl methacrylate matrix that is present in the impact-resistant polymethyl methacrylate. The ranges for the quantities of the melt viscosity at the processing temperature include all specific values and subranges therebetween, such as 25, 30, 35, 40, 45, 50, 55, 60, 65, 70, and 75% lower in comparison with the melt viscosity of the polymethyl methacrylate matrix that is present in the impact-resistant polymethyl methacrylate.

Polymethyl methacrylate is preferably a low-viscosity thermoplastic plastic. The melt viscosity can be 200 to 300 Pas. Suitable melt indices as determined according to ISO 1133 (230° C./3.8 kg) can lie in the range of 6 and 40, preferably 10 to 30 g/10 min. The ranges for the quantities of the melt indices include all specific values and subranges therebetween, such as 10, 15, 20, 25, 30, and 35 g/10 min. The weight-average molecular weight, Mw, may lie in the range of $5 \times 10^4$ to $1.5 \times 10^5$. The ranges for the quantities of the weight-average molecular weight include all specific values and subranges therebetween, such as $6 \times 10^4$, $7 \times 10^4$, $8 \times 10^4$, $9 \times 10^4$, $1.0 \times 10^5$, $1.1 \times 10^5$, $1.2 \times 10^5$, $1.3 \times 10^5$ and $1.4 \times 10^5$. The polymethyl methacrylate according to the present invention contains from 80 to 96, preferably 84 to 96 wt. % methyl methacrylate units. The ranges for the quantities of the methyl methacrylate include all specific values and subranges therebetween, such as 81, 82, 83, 84, 85, 86, 87, 88, 89, 90, 91, 92, 93, 94, and 95 wt. %. Further, the polymethyl methacrylate according to the present invention contains from 8 to 20, preferably 4 to 16 wt. % of softer monomers. The ranges for the quantities of the softer monomers include all specific values and subranges therebetween, such as 9, 10, 11, 12, 13, 14, 15, 16, 17, 18, and 19 wt. %. Examples of softer monomers include but are not limited to hydroxyethyl methacrylate, ethyl acrylate, butyl acrylate, or preferably methyl acrylate.

The desired flow behavior of the thermoplastic plastic can also be achieved by mixing plastics of high viscosity with plastics with a very low viscosity, or so-called flow improving agents.

In the present invention, a relatively small amount of the pre-mixture containing the lamellar-shaped carrier pigment may be added to the polymethyl methacrylate modified to be impact-resistant. Therefore, low-viscosity thermoplastic plastics can be used for the pre-mixture, as well as polymethyl methacrylate, as long as the properties of the polymethyl methacrylate modified to be impact-resistant are not compromised or insignificantly impaired. An example of a low-viscosity thermoplastic plastic is, but not limited to, polyethylene.

IR-reflective pigments to be used according to the present invention may be, but not limited to, IR-reflective particles of carrier pigments coated with a metal oxide. Examples of such IR-reflective particles of carrier pigments coated with a metal oxide are those described in any of DE 25 44 245 B2, EP-A 548 822, DE 196 18 569 A1. Further IR-reflective pigments to be used according to the present invention may be, but not limited to, so-called pearl-luster pigments. Pearl-luster pigments have a layer-shaped or lamellar-shaped structure. As a rule, they have a diameter of 20 to 100 µm. The ranges for the quantities of the diameter include all specific values and subranges therebetween, such as 25, 30, 35, 40, 45, 50, 55, 60, 65, 70, 75, 80, 85, 90, and 95 µm.

Infrared reflection of IR-reflective pigments is based on a dual reflection of light at the top and bottom of the particles, which may be aligned parallel to a surface. Depending on the thickness of the particles and the wavelength of the incident light, rays of light reflected at the top and the bottom of the particle can either amplify or cancel each other by interference. A amplification of the reflected radiation occurs when the incident beams hit the surface at a perpendicular angle and if $$d=(2x-1)L_T/4n$$

where d is the thickness of the particle, X=1, $L_T$ is the wavelength of the reflected radiation, and n is the index of refraction of the particle at this wavelength. In contrast, cancellation or weakening of the reflected light occurs if $$d=(x-1)L_t/2n$$

where here x=2 and $L_t$ is the wavelength of the light that in this case is not reflected but rather passes through the pigment. Combining the two equations produces the following equation:

$$L_T=2L_t$$

This means that at a certain layer thickness d, light with the wavelength $L_T$ is reflected most strongly, and light with half that wavelength $L_t$ is mostly allowed to pass through the IR-reflective pigment. In the present invention, a thickness of the particle can be selected in a manner that allows visible light to pass through the particle, while infrared light is most strongly reflected by the particle.

Various IR-reflective pigments are known that fulfill the ratio of thickness and index of refraction desired by the present invention. Such pigments include, but is not limited to, titanium dioxide. In particular anatase type titanium dioxide is preferred. The IR-reflective pigments according to the present invention include basic lead carbonate or bismuth oxychloride. Rutile type titanium dioxide, which may be precipitated on mica particles or similar mineral substances with a lamella shape, is particularly advantageous as an IR-reflective pigment according to present invention. Rutile type titanium dioxide may be used in light-scattering coatings that are particularly well suited for all types of roof glazing and skylights. In contrast to anatase type titanium dioxide, rutile type titanium dioxide does not catalytically attack the plastic matrix of the present invention, thereby resulting in a weather-resistant, long-life product. Products fractionated in size containing pigment particles of an average diameter or grain size of from 5 to 25 µm, are particularly suitable, since they tend to break less during processing. The ranges for the quantities of the average diameter or grain size include all specific values and subranges therebetween, such as 7, 9, 11, 13, 15, 17, 19, 21, and 23 µm. Laser light diffraction may be used to measure the average diameter or grain size of the pigment particles. Preferably at least 95%, preferably 98%, of the particles may have a size less than 25 µm.

IR-reflective particles may be used where a carrier pigment is coated with a layer of $TiO_2$ with a thickness of 90 to 150 nm, preferably 100 to 140 nm (only the $TiO_2$ layer is then considered to be the layer thickness d, not the substratum of mica). The ranges for the quantities of the layer thickness include all specific values and subranges therebetween, such as 95, 100, 105, 110, 115, 120, 125, 130, and 135 nm. An example of a carrier pigment is mica.

IR-reflective particles according to the present invention may contain a carrier pigment coated with alternating layers of metal oxide. Examples of IR-reflective particles containing a carrier pigment coated with alternating layers of metal oxide are described in DE 196 18 569 A1. DE 196 18 569 A1 describes multi-layer interference pigments containing transparent carrier materials coated with alternating layers of metal oxides with a low and a high index of refraction, where the difference in the index of refraction is at least 0.1. Accordingly, carrier pigment can be provided with an alternating layer of $TiO_2/SiO_2/TiO_2$, where the total of the layer thicknesses can lie in the range of 150 to 300 nm (the commercially available pearl-luster pigment AC 870, manufactured by Merck KGaA, Darmstadt, Germany, is suitable, for example). The ranges for the quantities of the total of the layer thicknesses include all specific values and subranges therebetween, such as 160, 180, 200, 220, 240, 260, and 280 nm.

Examples of polymethyl methacrylate modified to be impact-resistant according to the present invention and their production are described in EP-A 0 733 754.

The polymethyl methacrylate modified to be impact-resistant may be built up. An example of building up a polymethyl methacrylate modified to be impact-resistant is producing a polymethyl methacrylate comprising:

p1) 4 to 30 wt.-% of an elastomer, or E, phase; and p2) 70 to 96 wt.-% of a thermoplastic matrix, or M, phase of polymethyl methacrylate, where the sum of p1)+p2) comes to 100 wt. %. Further, the polymethyl methacrylate modified to be impact-resistant may contain up to 20 parts by weight of suitable comonomer particles with reference to 100 parts by weight of the total polymer, P. The polymethyl methacrylate modified to be impact-resistant may contain indices of refraction of the elastomer phase E and the matrix phase M that differ from one another by a maximum of n≦0.02.

The elastomer phase of a cross-linked polymer phase may contain 60 to 99.9 parts by weight alkyl acrylate and/or aryl acrylate, 0.1 to 10 parts by weight of suitable crosslinking agents and, if necessary, 0 to 30 parts by weight of suitable monofunctional ethylene-unsaturated monomers.

Preferably, $C_2$-$C_{10}$ alkyl acrylates are used as the alkyl acrylates. Examples of such $C_2$-$C_{10}$ alkyl acrylates include but are not limited to ethyl acrylate, propyl acrylate, isopropyl acrylate, amyl acrylate, hexyl acrylate, octyl acrylate, and decyl acrylate. $C_2$-$C_{10}$ alkyl acrylates especially preferred by the present invention are butyl acrylate and 2-ethylhexyl acrylate. Other preferred acrylates are phenyl acrylate, 2-phenylethyl acrylate, 3-phenyl-1-propyl acrylate, 2-phenoxyethyl acrylate, 2-phenoxyethoxyethyl acrylate, and especially benzyl acrylate.

The cross-linking agents are generally compounds with at least two ethylene-unsaturated, radically polymerizable radicals. Examples of compounds with two ethylene-unsaturated, radically polymerizable radicals include but are not limited to (meth)acrylic esters of diols, such as ethylene glycol di(meth)acrylate or 1,4-butane diol di(meth)acrylate, aromatic compounds such as divinyl benzene. Further, compounds with at least one allyl group are preferable as cross-linking agents. An example includes, but is not limited to allyl (meth)acrylate. The cross-linking agents may include those compounds having three or more ethylene-unsaturated, radically polymerizable radicals. Examples include, but are not limited to, triallyl cyanurate, trimethylol propane tri(meth)acrylate, and pentaerythritetra (meth)acrylate. Other examples of the cross-linking agents to be used according to the present invention are those described in U.S. Pat. No. 4,513,118.

The index of refraction of the elastomer phase is generally lower than that of the matrix phase M. Therefore, the comonomers that may be contained in 0 to 30 parts by weight in the elastomer phase primarily serve to make the index of refraction of the elastomer phase more similar to that of the matrix phase, M. Therefore, the present invention prefers comonomers with comparatively high indices of refraction. Examples of such comonomers are radically polymerizable aromatic compounds such as vinyl toluene, styrene, and α-methyl styrene. These comonomers are to be used in amounts that ensure they do not impair the weather resistance of the impact-resistant polymethyl methacrylate.

The matrix phase, M, of may be covalently bonded to the elastomer phase, and contain at least 5 wt. % of a polymethyl methacrylate, P. The polymethyl methacrylate may contain from 80 to 100 parts by weight of methyl methacrylate units, and may have a glass transition temperature of at least 70° C. Furthermore, the polymethyl methacrylate may contain from less than or equal to 20 parts by weight of additional ethylene-unsaturated, radically polymerizable comonomer unit. An example of a preferable ethylene-unsaturated, radically polymerizable comonomer unit is alkyl (meth)acrylates with 1 to 4 carbon atoms in the alkyl radical. The average molecular weight, MW, of the polymethyl methacrylate may be between $10^4$ and $10^6$, preferably between $3\times10^4$ and $5\times10^5$ Dalton. The ranges for the quantities of the average molecular weight of the polymethyl methacrylate include all specific values and subranges therebetween, such as $4\times10^4$, $6\times10^4$, $8\times10^4$, $1.0\times10^5$, $1.5\times10^5$, $2.0\times10^5$, $2.5\times10^5$, $3.0\times10^5$, $3.5\times10^5$, $4.0\times10^5$, and $4.5\times10^5$ Dalton. The molecular weight of the polymethyl methacrylate may be determined from techniques described by H. F. Mark et al. in Encyclopedia of Polymer Science and Engineering, 2nd edition, Vol. 10, pages 1 ff., J. Wiley, New York, (1989).

The elastomer phase may be a component of a two-stage or multi-stage emulsion polymerizate containing the polymethyl methacrylate that forms the matrix phase in an outer sheath. Preferred emulsion polymerizates are those having at least a three-stage structure. Such emulsion polymerizates contain a core of polymethyl methacrylate, a first shell, S1, of the elastomer phase, and a second shell, S2, of the polymethyl methacrylate, and may contain additional shells corresponding to shells S1 and S2. The impact-resistant polymethyl methacrylate may contain from 5 and 70 wt. %, preferably from 10 and 50 wt. % of an emulsion polymerizate. The ranges for the quantities of the emulsion polymerizate contained by the impact-resistant polymethyl methacrylate include all specific values and subranges therebetween, such as 10, 15, 20, 25, 30, 35, 40, 45, 50, 55, 60, and 65 wt. %. Polymethyl methacrylate plastic not contained in the latex particle may constitute the remaining weight proportions of the impact-resistant polymethyl methacrylate.

The impact-resistant polymethyl methacrylate may be produced by mixing the emulsion polymerizate with the polymethyl methacrylate. The emulsion polymerizate may be mixed with the polymethyl methacrylate by means of constant substance polymerization, in the melt. Subsequently, the aqueous phase and the emulsifier are removed. Before mixing the emulsion polymerizate with the polymethyl methacrylate, the emulsion polymerizate may be isolated from the aqueous phase. The emulsion polymerizate contain latex particles that may have a diameter of from 0.1 and 3 μm, preferably between 0.15 and 1 μm. The ranges for the diameter of the latex particles include all specific values and subranges therebetween, such as 0.15, 0.2, 0.4, 0.6, 0.8, 1.0, 1.2, 1.4, 1.6, 1.8, 2.0, 2.2, 2.4, 2.6, and 2.8 μm. An example of the structure of such latex particles and the isolation of the emulsion polymerizate for two-stage emulsion polymerizates is described in EP patent 0 033 999 (U.S. Pat. No. 4,543,383). An example of the structure of such latex particles and the isolation of the emulsion polymerizate for three-stage emulsion polymerizates is described in EP patent 0 113 925 (U.S. Pat. No. 4,513,118).

It is practical to work in the neutral or slightly acidic pH range during aqueous emulsion polymerization. The use of long-chain alkyl sulfates or alkyl sulfonates as emulsifiers is advantageous in such processes. Azo compounds, i.e. organic or inorganic peroxides may be used as polymerization initiators in such processes. Examples of such azo compounds are persulfates. The polymerization initiator may be used in the process at amounts ranging from $10^{-3}$ to 1 wt. %, with reference to the monomers. The ranges for the amount of polymerization initiator include all specific values and subranges therebetween, such as $2\times10^{-3}$, $4\times10^{-3}$, $6\times10^{-3}$, $8\times10^{-3}$, $2.5\times10^{-2}$, $5.0\times10^{-2}$, $7.5\times10^{-2}$, 0.1, 0.25, 0.5, and 0.75 wt. %.

Molecular weight adjusters may be used to adjust the aforementioned molecular weight $M_W$ of the polymethyl methacrylate present in the emulsion polymerizate. Examples of such molecular weight adjusters include but are not limited to mercapto compounds, such as 2-ethylhexyl glycolate or tert-dodecyl mercaptan.

Emulsion polymerizates that are coagulated and freed of water in an extruder are especially preferred by the present invention. The melt may be divided into several segments in the water-removal zone of the extruder, each of which is conveyed into a separate screw channel. The melt phase may be compressed into a cohesive melt cake in at least one of the intake slot of the twin screw within these screw channels, forming a pressure gradient at a closely limited location. The water is allowed to flow off ahead of the border of the melt cake by means of shear force towards the bottom through at least one take-off opening. During this time, the melt cake is not in contact with a cohesive aqueous phase, thereby removing the additives and contaminants contained in the water. Consequently the resultant weather-resistant material does not tend to yellow as a result of the presence of such additives and contaminants. A description of such weather-resistant material can be found see in EPA 0 683 028, as well as that resulting from a two-stage process in DE 197 18 597 C1.

The plastic elements produced according to the invention contain the plastic mixture obtained according to the process, and have resistance to damage as a result of hail. The degree resistance to damage as a result of hail may be measured by the hail impact test described in SIA V280. The hail impact test described in SIA V280 implements at least 4 J of energy, preferably at least 4.5 J, especially preferably at least 5 J. Swiss standard SN Construction 564 280, 1996 edition, Test 9, modified the hail impact test using polyamide balls with a diameter of approximately 20 mm. Further, Swiss standard SN Construction 564 280, 1996 edition, Test 9 is implemented without ice scales. The hail resistance, or $H_{20}$, is the lowest energy, measured in Joules, possessed by polyamide balls having a diameter of 20 mm which induces fracturing of the sample.

The above described selectivity characteristic number, or SKZ, measured in T/g as determined in DIN 67 507 may be more than 1.15, preferably at least 1.2, more preferably at least 1.3, and most preferably at least 1.4 T/g. As stated above, T is the degree of light transmission for daylight, i.e. standard light type light of D65 or $T_{D65}$, of the plastic element. Further, g is the total degree of energy passing through the plastic element. Therefore, the SKZ of a plastic element is the ratio of T/g, i.e. $T_{D65}/g$.

The plastic element may contain a plastic mixture only or in part. The plastic element may have a flat sheet or a hollow element structural geometry. An example of such a structural geometry is a multi-web plate, preferably a three-web or four-web plate, and most preferably a double-web plate. Other geometries are preferred by the present invention as well, such as web plates with slanted webs. These plates may be referred to as lattice-work plates.

One example of a plastic element according to the present invention is a plastic element that may contain only the plastic mixture and have the form of a double-web plate. Such plastic elements possess relatively good SKZ values. In contrast, three-web or four-web plates that consist entirely of a plastic mixture possess a poorer SKZ value in general than that of double-web plates. This phenomenon is believed to be due to the degree of light transmission for daylight (T, i.e. $T_{D65}$) dropping more sharply for three-web or four-web plates than the degree of total energy pass-through for radiation energy (g). Therefore, the SKZ value in T/g decreases for three-web or four-web plates.

The plastic element may contain the plastic mixture in part. Such a plastic element contains a partial proportion of the plastic mixture that can be a co-extruded flange of a multi-web plate. In this example, the co-extruded flange may have a thickness ranging from 1 to 6, preferably 2 to 4 mm. The ranges for the thickness of the co-extruded flange include all specific values and subranges therebetween, such as 1.5, 2.0, 2.5, 3.0, 3.5, 4.0, and 4.5 mm. Co-extruded flanges of such thickness can be used to produce any multi-web plates, three-web and four-web plates because the maintain good SKZ value and resistance to hail impact resistance. The co-extruded flange of such plates is thick enough to retain the desired SKZ values even in combination with low concentrations of IR-reflective particles.

It is practical if the plastic element has a degree of light transmission for daylight (T, i.e. $T_{D65}$) in the range of 10 to 70, preferably 15 to 55, most preferably 20 to 40%, depending on their purpose of use. The ranges for the degree of light transmission for daylight of the plastic element includes all specific values and subranges therebetween, such as 15, 20, 25, 30, 35, 40, 45, 50, 55, 60, and 65%.

A preferred use of the plastic element is for the production of a roofing or facade element and light strips in stairwells, etc. Examples of roofing or facades include, but is not limited to, greenhouse or winter garden roofs.

The plastic elements according to the present invention have a pink color appearance with a gleam similar to mother-of-pearl on the side facing the light. This pink color appearance occurs in commercially available plastic elements with an IR-reflective finish. Looking through the plastic elements against the light, the color impression is greenish. In many cases, the greenish color impression is reduced by adding a light-scattering pigment. An example of a light-scattering pigment is a white pigment, e.g. barium sulfate. Such light-scattering pigments may be added in amounts of 0.5 to 5 wt. %. The ranges for the amounts of light-scattering pigments includes all specific values and subranges therebetween, such as 1.0, 1.5, 2.0, 2.5, 3.0, 3.5, 4.0, and 4.5 wt. %. Adding these light-scattering pigments to the element reduces the glare effect when the sun is shining through the element by causing the light to be scattered.

Surprisingly, it is also found that the resistance to hail impact of a plastic element does not decrease if a white pigment, e.g. barium sulfate ($BaSO_4$) is present, in combination with an agent to modify impact resistance and IR-reflective pigment. In fact the resistance to hail impact of a plastic element can actually increase by adding the white pigment and agent. The white pigment, as well as the IR-reflective pigment, may be made added during the extrusion process for production of the plastic element according to the invention as a concentrated pre-mixture in granulate form. The granulate may contain from 10 to 30 wt. % white pigment. The ranges for the amounts of white pigment in the granulate includes all specific values and subranges therebetween, such as 12, 14, 16, 18, 20, 22, 24, 26, and 28 wt. %. Further, the white pigment may also be added in powder form during the extrusion process.

The process according to the invention is explained in more detail in Tables 1 and 2 and in the following examples.

EXAMPLES

The present invention is explained in more detail with the aid of the following embodiment examples. As can be seen from the following examples, the process according to the present invention produced a plastic element having a high degree of resistance and a high selectivity characteristic number, SKZ.

Example 1

Production of a pre-mixture, in granulate form, of a low-viscosity polymethyl methacrylate melt and IR-reflective pigment.

The pre-mixture is produced by working 25 wt.-% of the pigment Iriodin® 9223, Rutil Perllila (manufactured by Merck KGaA, Darmstadt, Germany) into the melt of a polymerizate containing 91 wt. % methyl methacrylate and 9 wt.-% methyl acrylate, at 300° C. The polymerizate is melted and transported in a twin-screw extruder with screws running in the same direction (D=34, model by Leistritz). The pigment is added via a side feed, without pressure, in a pressure-free, non-shearing extruder zone, via a screw metering system that works volumetrically. Production of a granulate with a length of 2.5 to 3.5 mm and a diameter of 2 to 3 mm occurs at 80° C. (surface temperature) by granulation.

Example 2

Production of 16 mm double-web plates from the pre-mixture from Example 1 and polymethyl methacrylate modified to be impact-resistant.

a) Polymethyl methacrylate modified to be impact-resistant.

Polymethyl methacrylate modified to be impact-resistant containing a polymer matrix of a polymerizate having 97 wt. % methyl methacrylate and 3 wt. % methyl acrylate and a proportion of 15 wt.-% polybutyl acrylate is obtained by mixing 64 wt. % polymethyl methacrylate with 36 wt. % of a core-shell emulsion polymerizate with a the first shell containing composition containing 20 parts by weight cross-linked polymethyl methacrylate core and 44 parts by weight cross-linked polybutyl acrylate co-styrene with the same index of refraction as the polymer matrix, and a second shell containing 36 parts by weight polymethyl methacrylate. A corresponding emulsion polymerizate may be obtained by a process described in EP-A 113 924.

Subsequently, double-web plates with a thickness of 16 mm are produced by means of extrusion. The granulate of the polymethyl methacrylate modified to be impact-resistant and the granulate of the pre-mixture from Example 1 are mixed with the IR-reflective pigment in a ratio of 133:1, and extruded through an extrusion die for the double-web plate in a twin-screw extruder, at about 240 to 260° C. After exiting from the extrusion die, the extrudate is stabilized in a vacuum calibration step and cooled.

Example 3

A double-web plate made of impact-resistant polymethyl methacrylate with white pigment (BaSO$_4$) and the addition of the IR-reflective pigment takes place in the granulate form of the pre-mixture described. The white pigment, BaSO$_4$, contained at 20 wt. % in a polymerizate of 97 wt. % methyl methacrylate and 3 wt.-% methyl acrylate was added in a final concentration of 2 wt. %.

Example 4

A double-web plate made of impact-resistant polymethyl methacrylate without white pigment (colorless). The addition of the IR-reflective pigment takes place in the granulate form of the pre-mixture described.

Comparative Example 5

A double-web plate made of impact-resistant polymethyl methacrylate with white pigment and without IR pigment.

The white pigment, BaSO$_4$, contained at 20 wt. % in a polymerizate of 97 wt. % methyl methacrylate and 3 wt. % methyl acrylate, was added in a final concentration of 2 wt. %.

Comparison Example 6

A double-web plate made of impact-resistant polymethyl methacrylate with white pigment. The addition of the IR-reflective pigment takes place by adding the bulk material (in the dry form and without a pre-mixture into the melt of the polymethyl methacrylate modified to be impact-resistant.

Table 1 summarizes the properties of the double-web plates from Examples 3 to 6:

TABLE 1

| Example | IR pigment addition from pre-mixture | IR pigment addition without pre-mixture | White Pigment | $T_{D65}$ [%] | g [%] | SKZ = $T_{D65}$/g | Hail $H_{20}$ [J] |
|---|---|---|---|---|---|---|---|
| 3 | + | − | + | 47.3 | 38.0 | 1.24 | 4.4 |
| 4 | + | − | − | 52.2 | 39.7 | 1.31 | 7.3 |
| 5 | − | − | + | 76.0 | 72.0 | 1.04 | 2.9 |
| 6 | − | + | + | 26.7 | 33.8 | 0.79 | 3.9 |

Example 7

The effect of the melt temperature during the production of a pre-mixture, containing IR-reflective pigment.

A pre-mixture is produced analogous to Example 1, except that the melt temperature is only 265° C. when the pigment is worked into the melt.

The granulates from Example 1 and 7 are melted in a thin layer and examined under a microscope.

In addition, the melt viscosity is determined as described in DIN 54 811, Process B 220° C./5 MPa (die L/D=4/1).

The granulates are melted in an extruder and applied, in a co-extrusion process (see, for example, EP-B 548 822, particularly Example 4) as co-extrusion layers with a thickness of approximately 30 µm, onto double-web plates of polymethyl methacrylate, with a thickness of 16 mm, extruded at the same time. The selectivity characteristic numbers (SKZ=T/g, i.e. T$_{D65}$/g) of the plates obtained are determined as described in DIN 67 507. Table 2 lists the results.

TABLE 2

| | Example | |
|---|---|---|
| | 1 | 7 |
| Melt temperature during production of the pre-mixture | 300° C. | 265° C. |
| Microscopy | Only a small amount of pigment breakage visible | Clearly more pigment breakage than in Example 1, many microparticles, pigment rounded off |
| Melt viscosity according to DIN 54 811, Process B 220° C./5 MPa, die L/D = 4/1 | 717 Pas | 935 Pas |
| SKZ = $T_{D65}$/g | 1.36 | 1.24 |

The present application claims priority to German Application No. DE 101 22 315.3, filed on May 8, 2001, which is hereby incorporated by reference in it entirety.

Numerous modifications and variations on the present invention are possible in light of the above teachings. It is, therefore, to be understood that within the scope of the accompanying claims, the invention may be practiced otherwise than as specifically described herein.

Unless specifically defined, all technical and scientific terms used herein have the same meaning as commonly understood by a skilled artisan in biochemistry, chemistry, and materials science.

All methods and materials similar or equivalent to those described herein can be used in the practice or testing of the present invention, with suitable methods and materials being described herein. All publications, patent applications, patents, standards, and other references mentioned herein are incorporated by reference in their entirety. In case of conflict, the present specification, including definitions, will control. Further, the materials, methods, and examples are illustrative only and are not intended to be limiting.

What is claimed is:

1. A process for the manufacturing a roof or a face of a building, comprising:
   constructing said roof from a plastic element which comprises an impact-resistant, thermoplastic plastic, and from 0.01 to 2 wt. % of IR-reflective particles comprising lamellar-shaped carrier pigments coated with a metal oxide,
   wherein said element is a double-web plate;

wherein the plastic element is made by a process comprising:
mixing said IR-reflective particles with a melt of a low-viscosity thermoplastic plastic at a temperature of at least 280° C. in a pressure-free, non-shearing zone of a twin-screw extruder to form a pre-mixture comprising from 5 to 40 wt. % of said IR-reflective particles;
extruding said pre-mixture;
converting said pre-mixture to granulate form or a melt;
mixing said granulate or melt of the premixture with a granulate or a melt of a polymethyl methacrylate modified to be impact-resistant to form a plastic mixture wherein said polymethyl methacrylate comprises a polymer matrix and an agent to modify impact resistance;
extruding or co-extruding the resultant plastic mixture with a melt of a thermoplastic plastic into an extrudate having a desired shape; and
cooling said extrudate.

2. A roof or a face of a building, comprising:
a plastic element which comprises an impact-resistant, thermoplastic plastic, and from 0.01 to 2 wt. % of IR-reflective particles comprising lamellar-shaped carrier pigments coated with a metal oxide,
wherein said element is a double-web plate;
wherein the plastic element is made by a process comprising:
mixing said IR-reflective particles with a melt of a low-viscosity thermoplastic plastic at a temperature of at least 280° C. in a pressure-free, non-shearing zone of a twin-screw extruder to form a pre-mixture comprising from 5 to 40 wt. % of said IR-reflective particles;
extruding said pre-mixture;
converting said pre-mixture to granulate form or a melt;
mixing said granulate or melt of the premixture with a granulate or a melt of a polymethyl methacrylate modified to be impact-resistant to form a plastic mixture wherein said polymethyl methacrylate comprises a polymer matrix and an agent to modify impact resistance;
extruding or co-extruding the resultant plastic mixture with a melt of a thermoplastic plastic into an extrudate having a desired shape; and
cooling said extrudate.

3. A building, comprising the roof or face of a building according to claim 2.

4. A method of producing a building, comprising
constructing said building from the roof or face of a building according to claim 2.

5. The process according to claim 1 wherein said carrier pigment is coated with alternating layers of metal oxide.

6. The process according to claim 1 wherein said carrier pigment is coated with alternating layers of metal oxide;
wherein a difference of the index of refraction between two alternation layers is at least 0.1.

7. The process according to claim 1 wherein said carrier pigment is coated with a layer of metal oxide having a thickness of 90 to 150 nm.

8. The process according to claim 1, wherein said element is resistant to hail.

9. The process according to claim 1, wherein said element is resistant to polyamide balls with a diameter of approximately 20 mm having at least 4 J of energy.

10. The process according to claim 1, wherein said plastic element comprises from 0.1 to 2 wt. % of said IR-reflective particle.

11. The process according to claim 1, wherein said plastic element comprises a white pigment.

12. The process according to claim 11, wherein said white pigment is present at an amount ranging from 0.5 to 5 wt. %.

13. The process according to claim 1, wherein said plastic element is a flat sheet or a hollow element.

14. The roof or a face of a building according to claim 2, wherein said carrier pigment is coated with alternating layers of metal oxide.

15. The roof or a face of a building according to claim 2, wherein said carrier pigment is coated with alternating layers of metal oxide;
wherein a difference of the index of refraction between two alternation layers is at least 0.1.

16. The roof or a face of a building according to claim 2, wherein said carrier pigment is coated with a layer of metal oxide having a thickness of 90 to 150 nm.

17. The roof or a face of a building according to claim 2, wherein said element is resistant to hail.

18. The roof or a face of a building according to claim 2, wherein said element is resistant to polyamide balls with a diameter of approximately 20 mm having at least 4 J of energy.

19. The roof or a face of a building according to claim 2, wherein said plastic element comprises from 0.1 to 2 wt. % of said IR-reflective particle.

20. The roof or a face of a building according to claim 2, wherein said plastic element comprises a white pigment.

21. The roof or a face of a building according to claim 20, wherein said white pigment is present at an amount ranging from 0.5 to 5 wt. %.

22. The roof or a face of a building according to claim 2, wherein said plastic element is a flat sheet or a hollow element.

* * * * *